Patented July 16, 1935

2,008,147

UNITED STATES PATENT OFFICE 2,008,147

MANUFACTURE OF COMPRESSED CARBONACEOUS MATERIALS AND ACTIVATED CARBON

Jacque C. Morrell, Oak Park, Ill.

No Drawing. Application July 11, 1934, Serial No. 734,691

7 Claims. (Cl. 252—3)

This invention relates to the production of adsorptive or activated carbons. More especially it relates to an improvement in the concepts and processes of my previously issued patents and in my co-pending application Serial No. 654,111, filed January 28, 1933, and Serial No. 714,534, filed March 7, 1934, for the production of adsorptive charcoals or activated carbons.

The process is especially applicable to improvements in the steps of a process for making structural adsorptive carbon. In activated carbons of this type it is very important that the supporting walls of the individual particles be dense or firm and that the particle or granule itself possess the necessary structural strength required of the granular type of carbons. As examples are the carbons which possess sufficient structural strength to permit their use in filter columns or beds without excessive disintegration, comparable to bone black, such as is employed in filter columns in the refining of sugar, or to the activated charcoals such as cocoanut char used for vapor adsorption from gases, in gas masks, catalysts, etc. The structural strength of these and other types of chars is of highest importance since the life of the material depends upon its maintaining its original size and granular form. The term "structural activated carbon" as used herein further means a material which may be employed in a granular condition and implies the necessary structural strength to withstand or resist shattering, abrasion and crushing for practical purposes and to be retained in a granular or particle form of relatively large size.

The product of the present process may be employed in various industrial processes as a decolorizing and purifying agent for the removal of color and impurities from liquids and solutions, the removal of vapors from gases, purification of air, as a catalyst, and in general it may be applied wherever adsorptive decolorizing or purifying material of structural character is required. It is to be understood, of course, that the structural product may be reduced in size and may be used in a finely divided or powdered condition. Also that the powdered material may also be applied to the uses shown below. Among its specific uses are the refining and decolorization of oils and their derivatives; the refining and decolorizing of mineral, animal and vegetable oils; as a catalyst; for decolorizing, purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, medicinals, pharmacepticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, paint oils, varnishes and resins, garage wastes, etc.

In its general aspect the present invention comprises mixing finely divided carbons with a binder which chars on heating, compressing, molding, briquetting or extruding this mixture, or in general a mixture of carbon and a binder which chars on heating, under a substantial pressure, subjecting the mixture to a temperature adequate to carbonize the said binder and thereafter to an activation treatment, such as treatment with steam at elevated temperatures or with other mild oxidizing agents. Preferably the molded or briquetted product is comminuted before carbonizing but there may be conditions under which it is carbonized, or partially carbonized, first and then comminuted. In some cases the product is subsequently treated with a solvent such as hot water and/or dilute acid to remove ash or inert substances therefrom. The final product of the present invention is of a granular structural form of suitable size and may be employed in filter columns, beds, etc.

The present invention is particularly directed to the mixing step of the process described but it may also be employed in connection with processes for the production of activated or adsorptive carbons of a non-structural character such as is described in my application Serial No. 624,051, as well as in the production of activated carbons of the structural type.

In one of the more specific aspects of the inventions described in the afore-mentioned patents and applications a carbonaceous material such as wood char, or a mixture of carbonaceous materials such as coke and wood char, or coal and wood char, preferably in finely divided form, is mixed with a binder in emulsified form comprising tars, pitches and the like, or in general a binder of bituminous character. One method of preparing the emulsion of binder is disclosed in my Patent No. 1,440,356. Other methods may, of course, be employed. Still another method of mixing carbon with a binder is described in my Patent No. 1,478,987, which comprises generally mixing a non-fluid or solid pitch or similar binder in finely divided form, which chars on heating, with carbon or a mixture of carbon, and thereafter wetting or moistening the mixture so made with a fluid such as oil tar or the like or in general an organic liquid which will dissolve, disperse or flux with the binder. I have already disclosed in the afore-mentioned application Serial No. 654,111 that the moistening or wetting liquid employed in this connection may be in an emulsified state and the present invention may therefore be construed as a continuation in part of said application.

In its most specific aspect the present invention comprises mixing carbon with a non-fluid or solid binder preferably of a bituminous character in finely divided state and thereafter adding to the said mixture an emulsion containing in the internal phase an oil or other organic liquid generally capable of dissolving, dispersing or fluxing with the binder.

It is to be particularly stressed that the emulsion which I preferably employ in connection with the present invention is of the oil in water type. I have already shown the relationship of the present invention to my previous inventions which are closely related to it. I am aware of the process described in Patent No. 1,825,756, patented October 6, 1931, and issued to Otto Reynard. In this process finely divided coal or other fuel, or in general pulverulent material in finely divided form, is mixed with a solid bituminous material and an emulsion of the water in oil type is added thereto. In the general aspect of the present invention I specifically disclaim the use of the water in oil type of emulsion since in this type of emulsion the oil is in the continuous phase and therefore does not form discrete particles which will permit them to combine with the finely divided pitch or other non-fluid or solid bituminous material in the mixture in the manner generally described in my Patent No. 1,440,356. It is believed necessary that to obtain best results in the mixing of the binder and consequently in the quality of the finished activated carbon product to have the binder distributed uniformly and this is best accomplished in connection with the present invention if all of the material, namely, the carbon, the pitch or other finely divided solid bituminous material, and the oil are in finely divided form. This is not the case when the oil is in the external or continuous phase in the emulsion but is so when the oil is in the internal or discontinuous phase of the emulsion. The particular phase in which the oil exists may be readily determined by inspection under a microscope and the determining factor as to whether the oil will be in the internal phase will depend upon the character of the oil itself, the character of the emulsifying agent, and to some extent on the relative proportions of the oil and water. I may, however, employ a water in oil emulsion in certain specific cases but its use is not to be construed as the equivalent of the oil in water type for the reasons given above.

The various carbonaceous materials which may be employed in connection with the present invention may comprise carbons of mineral origin, such as the cokes obtained from the distillation and/or cracking of petroleum, coal tar, lignite tar, gas tar and the like, or from the destructive distillation of corresponding pitches, asphalts and the like, as well as the cokes obtained from the destructive distillation of anthracite, semi-anthracite, bituminous and sub-bituminous coals, or the coals themselves, and the more active types of carbon such as wood charcoal, or the chars obtained from vegetable materials generally; also chars of animal origin such as boneblack and the carbon obtained from the incomplete combustion of gases wherein the carbon is deposited at relatively low temperature, for example, carbon black and lamp black resulting from the incomplete combustion of inorganic material generally. Carbons containing substances of intermediate character, such as lignites, peats and the like, may also be employed. Mixtures of carbon from mineral, vegetable and animal sources may be used in connection with the present invention.

The binders used in the present invention are generally those which char on heating, preferably of a bituminous character, such as the pitches which in general are the residues produced from organic substances, such as oils, tars and the like, when subjected to destructive distillation in complete or partial absence of air and to such an extent that a complete carbon residue is not produced. Such solid pitches or bituminous materials usually soften or liquefy when heated.

Some of the common classes of pitches are: (a) Tar pitches, which include those produced from the tars of wood, bone, coal, shale, lignite, peat, straw, vegetable matter and bitumens, water gas and oil gas tars; (b) oil pitches, including the residues from distillation and cracking of animal, vegetable and petroleum oils of asphalt, paraffin, naphthene or other base; (c) pitches from destructive distillation of animal and vegetable matter, including those of stearin, palm oil, bone fat, packing house fat, garbage, sewage, grease, etc.; (d) pitches resulting from the destructive distillation of native bitumens, asphalts, asphaltites, etc. Various oils (in many cases from the tars mentioned above) may be used in conjunction with the above pitches as binders, e. g., coal tar oils, wood tar oils, petroleum oils, particularly cracked petroleum residues, etc. Preferably pitches from coal or the corresponding tars thereof and pitchy or heavy liquid residues from petroleum, both straight distillation and cracking, are preferred, the coal tar pitches being the most desirable, especially for structure and hardness of the resulting product while the vegetable pitches such as wood tar are preferred for activity. The pitches obtained from coal or wood tar are therefore preferred.

In connection with the selection of the binders consideration is given to the efficiency and structural strength of the product desired. This refers to the sources of the binder as well as to its physical form, i. e., whether it is a heavy hydrocarbon fluid residue, tar, pitch or asphalt, etc.

The oil or other organic liquids used for preparing the emulsions must be such that they are wholly or partly insoluble in water and will flux, disperse or dissolve wholly or partly in non-fluid or solid pitchy material which is employed as a binder. The term "oil" as herein employed is intended to include a vast number of substances, both natural and artificial, and possessing widely varying physical properties and chemical structure. All of the substances included within this term are practically insoluble in water, possess a characteristic greasy touch, and have a relatively low surface tension. These include the animal oils of both land and sea animals, vegetable oils, both drying and non-drying, and petroleum or mineral oils of various classes as well as the oils obtained from the distillation of various tars such as those obtained from coal and wood. The oils may be emulsified by dispersing them in water containing an emulsifying agent. Emulsifying agents employed may comprise glues, gelatins, albumen, casein and other protein material, pectins, polysaccharides and hemi-celluloses, including the various starches, dextrin, agar agar, alginates and the like; gums, such as gum arabic, gum tragacanth, seed and moss gums; soaps as well as the equivalents thereof, including an alkaline substance plus a fat or saponifiable oil; tannins obtained from various sources, including the waste sulphite liquor from the paper industry; finely divided substances such as clays, and colloidal solids generally, alone or in combination with the afore-mentioned materials. Specifically, emulsifying agents may be made by dissolving soaps in water, using for example from 1 to 10 per cent of the soap solution. Starches, glue and gelatin may be likewise employed. A satisfactory emulsifying agent may be made by dissolving 2 per cent by weight of casein in an aqueous solution containing approximately 1 per cent by weight of sodium carbonate or other alkaline solutions.

In carrying out the process of the invention the carbonaceous material in finely divided state, for example wood char, petroleum or other coke, coal or various mixtures thereof, is thoroughly mixed with the finely divided solid pitch or bituminous material generally. This mixture may be wetted by a very dilute solution of the emulsifying agent. The oil may be emulsified by thoroughly shaking or otherwise agitating the same with the aqueous dispersing medium containing the emulsifying agent and the emulsion so obtained, may then be added to and thoroughly admixed with the mixture of finely divided carbon and bituminous materials.

One of the advantages of the present method of mixing the materials so described is that it eliminates the necessity of subsequently filtering the water or even drying the same prior to briquetting, or in general compressing the mixture. This results in a marked saving both in capital investment for equipment and in operating costs.

It is obvious that the present invention may be applied to the production of briquetted fuels (followed by drying the briquets if desired) are its use is contemplated in connection therewith, although it is not equivalent to the application of the invention in the production of activated carbons as the final product comprising activated carbon is the result of all the cooperative steps, of which the present invention is a component part.

When preparing briquetted or compressed fuels the percentage of binder employed may vary from approximately 4 to 6 per cent, based upon the amount of solid bituminous material in respect to the weight of carbonaceous material.

In preparing activated carbons the percentage of pitch or bituminous binder employed may comprise from approximately 20 per cent to approximately 50 per cent by weight of the carbonaceous material. The amount of oil used in the emulsion depends upon many factors and in general will vary from approximately 20 per cent to 50 per cent and upward of the pitch or bituminous binder employed.

In the production of structural activated carbons the mixture of carbons and binders made up as described is compressed, molded, briquetted or extruded, preferably comminuting the molded or compressed product, heating to carbonize the binder and then activated usually by heating in the presence of steam and other oxidizing gas. The final product may then be treated with a dilute solution of an acid such as hydrochloric acid, for example, approximately 1 to 3 per cent, to remove undesirable ash components and may then be finally water-washed. Usually the carbons employed for the structural product comprise a mixture of mineral and non-mineral carbons, for example, petroleum coke or other coke or coal or mixtures of the same mixed with wood char or other vegetable carbon. In preparing non-structural activated carbons the compression step may be omitted and usually a vegetable or non-mineral carbon is employed as raw material.

Specific examples of the process of the invention are shown below:

1. Non-structural adsorptive carbon. Approximately 2½ parts by weight of finely divided hardwood charcoal of approximately 150 to 200 mesh and upward is mixed with one part of finely divided wood or coal tar pitch. The melting point of the pitch should be such as to permit ready grinding, for example, 225 to 300° F. melt point. The pitch is ground to approximately 50 mesh and upward prior to mixing. After thoroughly admixing the finely divided wood char and pitch the oil in water emulsion is added thereto. In the present example may comprise an emulsion of creosote oil or other coal tar distillate made up by dispersing the oil in approximately an equal volume of water containing approximately 2 per cent of casein in a 1 per cent solution of sodium carbonate. The amount of emulsion added may be based upon a proportion of oil corresponding to from approximately 20 to 40 per cent by weight of the pitch. The emulsion is thoroughly admixed with a mixture of carbon or charcoal and bituminous binder e. g. wood tar pitch. The mixture may then be fed directly into the carbonizing furnace and heated for a sufficient length of time and at a high enough temperature to carbonize or char the binder. The time of heating may be generally 30 minutes to one and one-half hours and the temperature approximately 1200° to 1400° F.

The product may then be activated by treating with steam or other oxidizing gas for approximately one hour to four hours at a temperature of approximately 1600° to 1800° F.

The resulting activated product may then be treated with a dilute solution of hydrochloric or other acid and subsequently water washed and ground to proper size, or may first be ground and then acid treated and washed. This material, after drying, is the finished product.

2. Structural activated carbon. The raw carbon materials used in this particular case are petroleum coke from the cracking or distillation of petroleum and charcoal, preferably from hard wood. This carbonaceous material is approximately 50 mesh and upward, approximately 150 to 200 mesh being preferred. Coal tar pitch of approximately 225–300 melt point is ground to approximately 50 mesh and upward.

The finely divided carbon and pitch are mixed in the proportions of approximately 3 to 1 to 4½ to 1 of the carbons to the pitch.

The emulsion as prepared in Example 1 is added to the mixture of finely divided carbons and pitch in the proportion of approximately 20 per cent to 40 per cent of the oil by weight of the pitch. The material is then compressed by briquetting or otherwise preferably by warming prior to compressing and the briquette reduced in size to approximately 8 to 16 mesh or other size suitable for column filtration in the treatment of sugar solutions or other material to be treated.

The granular material is then carbonized by heating to a temperature of approximately 1200 to 1400° F. for a period of approximately ½ to 1½ hours and is then activated by treating with steam or other oxidizing gas for a period of approximately one to two hours at a temperature of approximately 1600° to 1800° F. The activated material is then treated with dilute acid, such as hydrochloric or other acid, water washed and dried.

By the expression "a gas having a mild oxidizing action" as used in the claims is meant steam, carbon monoxide, carbon dioxide, flue gas, air, and gases producing a similar effect, employed under conditions where the action is mildly oxidizing. In this particular definition, therefore, the term "gas" is broadly employed to cover vapors as well as gases.

Coal may be used in the above example instead of or in addition to coke, preferably employing a mixture of anthracite or coke and bituminous coal, particularly a coking coal, and varying the proportion so that the particles when carbonized are of proper structure and strength and will not flux to any substantial degree. The general principle employed here is the use of mixtures containing coke or a non-coking, low volatile, coal such as anthracite coal, a coking coal such as a bituminous coal, a non-mineral carbon such as a vegetable carbon, and the bituminous binder, etc., in accordance with the invention.

It is also to be understood that the invention may be applied to the manufacture of fuel briquettes from coal and similar material. When employing the present invention to prepare fuels smaller amounts of binder are used and the briquettes may be used as prepared or thereafter dried, or later carbonized, if desired.

I claim as my invention:

1. A process for the production of compressed carbonaceous material which comprises, mixing a comminuted, non-fluid or solid bituminous substance with a carbonaceous material, also in comminuted state, adding to the resulting mixture an emulsion of an oleaginous substance, the said emulsion being of the oil-in-water type, and compressing the same to the desired form.

2. A process for the production of coal briquettes which comprises, mixing a comminuted, non-fluid or solid bituminous substance with coal, also in comminuted form, adding to the resulting mixture an emulsion of an oleaginous substance, the said emulsion being of the oil-in-water type, and compressing the same to the desired form.

3. A process for the production of compressed carbonaceous material which comprises, mixing a comminuted, non-fluid or solid bituminous substance with carbonaceous material, also in comminuted state, adding to the resulting mixture an emulsion of an oleaginous substance, the said emulsion being of the oil-in-water type, warming the mixture, and compressing the same to the desired form.

4. A process for the production of activated carbon which comprises, mixing the carbon with a comminuted, non-fluid or solid binder which chars on heating, adding to the resulting mixture an emulsion of an oleaginous substance, the said emulsion being of the oil-in-water type, heating the mixture to a temperature adequate to carbonize the said binder, and activating the resulting product by subjecting the same to the action at elevated temperature of a gas having a mild oxidizing action.

5. A process for the production of structural activated carbon which comprises, mixing carbon with a comminuted, non-fluid or solid binder which chars on heating, adding to the resulting mixture an emulsion of an oleaginous substance, of the oil-in-water type, compressing the mixture, heating the compressed material to a temperature adequate to carbonize the said binder, and activating the resulting product by subjecting the same to the action at elevated temperature of a gas having a mild oxidizing action.

6. A process for the production of structural activated carbon which comprises, mixing carbon in comminuted form with a non-fluid or solid bituminous substance, also in comminuted form, adding to the resulting mixture an emulsion of an oleaginous substance of the oil-in-water type, compressing the mixture, comminuting the resulting compressed material, heating the comminuted material to a temperature adequate to carbonize the same, and activating the resulting product by heating in the presence of steam.

7. A process for the production of structural activated carbon which comprises, mixing a mineral carbon of the class consisting of coals and cokes with a vegetable carbon and with a solid or non-fluid binder which chars on heating, adding to the resulting mixture an emulsion of an oleaginous substance wherein the said oleaginous substance is in the internal phase, compressing the mixture under substantial pressure, comminuting the resulting compressed material, heating the comminuted material to a temperature adequate to carbonize the same, activating by heating in the presence of steam and removing undesirable impurities, and treating the resulting product with a dilute acid.

JACQUE C. MORRELL.